United States Patent [19]
Whiting et al.

[11] Patent Number: 5,543,057
[45] Date of Patent: Aug. 6, 1996

[54] SUPERCRITICAL WATER OXIDATION OF ORGANICS USING A MOBILE SURFACE

[75] Inventors: Philip Whiting, Milton; Anthony H. Mehta, Oakville, both of Canada

[73] Assignee: Abitibi-Price, Inc., Mississauga, Canada

[21] Appl. No.: 402,621

[22] Filed: Mar. 13, 1995

[51] Int. Cl.$^6$ .................. C02F 1/72; C02F 11/08
[52] U.S. Cl. ............... 210/721; 210/761; 210/908
[58] Field of Search ................ 210/721, 722, 210/761, 762, 765, 766, 908, 909, 737

[56] References Cited

U.S. PATENT DOCUMENTS

| | | | |
|---|---|---|---|
| 2,665,249 | 1/1954 | Zimmermann | 210/2 |
| 2,944,396 | 7/1960 | Barton | 60/39.05 |
| 4,292,953 | 10/1981 | Dickinson | 126/263 |
| 4,543,190 | 9/1985 | Modell | 210/721 |
| 4,822,497 | 4/1989 | Hong et al. | 210/721 |
| 5,100,560 | 3/1992 | Huang | 210/721 |
| 5,200,093 | 4/1993 | Barner et al. | 210/761 |
| 5,232,604 | 8/1993 | Swallow et al. | 210/762 |
| 5,250,193 | 10/1993 | Sawicki et al. | 210/761 |
| 5,252,224 | 10/1993 | Modell et al. | 210/761 |
| 5,358,645 | 10/1994 | Hong et al. | 210/762 |
| 5,358,646 | 10/1994 | Gloyna, et al. | 210/761 |
| 5,384,051 | 1/1995 | McGinness | 210/761 |
| B1 4,338,199 | 11/1988 | Modell | 210/721 |

FOREIGN PATENT DOCUMENTS

| | | |
|---|---|---|
| 0535320A | 4/1993 | European Pat. Off. . |
| PCT/US81/00592 | 11/1981 | WIPO . |
| WO89/08614 | 9/1989 | WIPO ............. 210/762 |
| PCT/US91/00606 | 8/1991 | WIPO . |
| PCT/US92/05320 | 6/1992 | WIPO . |

Primary Examiner—Thomas G. Wyse
Attorney, Agent, or Firm—Hoffmann & Baron

[57] ABSTRACT

A method for oxidizing organic material in an aqueous stream containing one or more inorganic salts, inorganic salt precursors or mixtures thereof, comprising oxidizing said organic material under supercritical conditions in the presence of an oxidant and a mobile surface of particles to which inorganic salts insoluble under the reaction conditions can adhere.

11 Claims, 2 Drawing Sheets

FLOW-THROUGH MOBILE-SURFACE SCWO SYSTEM

SUPERCRITICAL WATER OXIDATION OF ORGANICS USING A MOBILE SURFACE

FIELD OF THE INVENTION

This invention relates to the oxidation of organic compounds in an aqueous stream under supercritical conditions for the aqueous stream. The invention relates in particular to the oxidation of an aqueous stream containing organic compounds and inorganic salts, or salt precursors, insoluble under supercritical conditions in the presence of a mobile surface providing a surface to which inorganic salts insoluble under supercritical conditions can adhere.

BACKGROUND OF THE INVENTION

Organic compounds in an aqueous stream can be oxidized to carbon dioxide and water using several methods. One well known method is Wet Air Oxidation (WAO) or the Zimmerman process (U.S. Pat. No. 2,665,249). According to this process, an organic material and an oxidizing agent, frequently air or pure oxygen, are heated in a pressurized reactor so that the reaction temperature remains below the critical temperature of water (about 374° C.) and the pressure is in the range of about 1500 to 2500 psi. At these temperatures and pressures, both a liquid and a gas phase are present. Residence times of 0.5 to 1.0 hours result in oxidation of 70% to 95% of the organic compounds in the waste stream.

If more complete oxidation of the organic compounds is sought, the oxidation may be carried out under supercritical conditions for the aqueous stream (typically, a temperature greater than 374° C. and a pressure greater than 3200 psi). This process, known as Supercritical Water Oxidation (SCWO), typically requires residence times of a few seconds to a few minutes and can result in the oxidation of more than 99% of the organic compounds present.

Water under supercritical conditions forms a single fluid phase having quite different characteristics from water in a liquid-gas two phase system of the type which exists under subcritical conditions. For example, subcritical water is a poor solvent for non-polar materials (including many organic materials) and a good solvent for polar materials (including many inorganic materials). However, at and above the critical point of water, many organic compounds become readily soluble in water and many inorganic compounds become insoluble.

For example, at 25° C., benzene is sparingly soluble in water (0.07 weight percent). However, under supercritical conditions, benzene and water are completely miscible in all proportions (Connolly, J., "Solubility of Hydrocarbons in Water Near the Critical Solution Temperature", J. Chem Eng. Data 11(1), 13 (1966)).

Sodium chloride (NaCl) has a solubility of about 37 weight percent (370,000 ppm) under subcritical conditions at 300° C. and about 120 ppm under supercritical conditions of 550° C. and 25.0MPa (Pitzer, K. S. and R. T. Pabalan, "Thermodynamics of NaCl in Steam", Gechim. Cosmochim. Acta 50, 1445 (1986)).

Calcium chloride ($CaCl_2$) has a maximum solubility of 70 weight percent at subcritical temperatures and 3 ppm at 500° C. and 25 MPa (Martynova, O. I., "Solubility of Inorganic Compounds in Subcritical and Supercritical Water", High Temperature, High Pressure Electrochemistry in Aqueous Solutions, D. de G. Jones and R. W. Staehle, eds. Houston: National Association of Corrosion Engineers, (1976))

Oxygen is also completely miscible with water under supercritical conditions (Japas, M. L., and E. U. Franck, "High Pressure Phase Equilibria and PVT Data of the Water-Oxygen System Including Water-Air to 673° K. and 250 MPa", Ber. Bunsenges Phys. Chem 89, 1268 (1985)).

The fact that oxygen and many organics are completely miscible with water under supercritical conditions means that they come into intimate contact in a single phase contributing to very rapid oxidation.

However, the insolubility of many inorganic compounds under the same supercritical reaction conditions results in a serious scaling problem, with inorganic precipitates fouling surfaces and valves inside, and downstream of, the reactor, which is the problem to which this patent is directed.

It is possible in some cases to dissolve inorganic compounds in supercritical water by increasing the pressure significantly. For example, sodium sulphate has a solubility of 99.9% in supercritical water at temperatures of 450° and pressures of 26000 psi. However, this patent is directed towards supercritical water oxidation reactions carried out at temperatures and pressures in which the inorganic compounds present in the aqueous stream are insoluble and present scaling problems.

U.S. Pat. No. 2,944,396 to Barton and Zimmerman et al. describes the use of "vapour phase" oxidation for the oxidation of organic compounds in an aqueous stream. It describes an improvement to the wet air oxidation process of Zimmerman wherein a second oxidation stage is added. The effluent vapours from the wet air oxidation process are oxidized in a second reactor under supercritical conditions −842° F. to 1034° F. (column 5, lines 40–53) and at pressures from 800 to 6,500 psi, which pressure range encompasses both subcritical and supercritical conditions. The result is substantially complete combustion of all organics (column 5, line 60).

More recently, supercritical water oxidation processes have been disclosed which directly treat organic compounds in an aqueous stream without a prior wet air oxidation step. U.S. Pat. No. 4,292,953 to Dickinson discloses the supercritical oxidation of a carboniferous fuel to produce thermal, mechanical or electrical energy. Dickinson notes that if the salt concentration is too high, it can result in scaling of the reactor or scaling or plugging of down stream heat exchange equipment (column 6, lines 33–47).

U.S. Pat. No. 4,338,199 (Modell No. 1) and U.S. Pat. No. 4,543,190 (Modell No. 2) disclose the use of supercritical water oxidation to oxidize, and thereby destroy, toxic organic compounds and to produce useful energy.

According to the disclosure of these patents, the insolubility of many inorganic salts under supercritical conditions means that supercritical water oxidation can be used to desalinate sea water and brine. If the aqueous stream containing the organics is sea water or brine, under supercritical conditions, salt precipitates out of the single fluid phase almost immediately, thus enabling desalination in a rapid and continuous process (Modell No. 1, column 2, lines 58–63). The patents note that inorganic material may tend to build up on the walls of the reactor causing hot spots with subsequent destruction of the reactor walls (Modell No. 1, column, lines 8–23).

The scaling problem resulting from the insolubility of inorganic compounds at supercritical conditions has been a major impediment to the commercialization of supercritical water oxidation. Many waste streams containing organic compounds also contain inorganic salts in concentrations sufficient to cause severe scaling under supercritical conditions resulting in frequent reactor shutdowns for descaling.

A number of attempts have been made to solve the scaling problem. U.S. Pat. No. 4,822,497 (Hong et al.) discloses a method of conducting supercritical water oxidation wherein the reactor has a supercritical temperature zone in the upper region of the reactor and a lower temperature zone in the lower region of the reactor which has a liquid phase. The supercritical oxidation occurs in the upper region. Precipitates and other solids from the oxidized supercritical temperature zone are transferred to the lower temperature zone so as to produce a solution or slurry. The solution or slurry is then removed from the reactor.

U.S. Pat. No. 5,100,560 (Huang) discloses an alternate method for dealing with the scaling problem in the reactor. According to this disclosure, the reactor once again has a supercritical temperature zone and a lower temperature zone. At least a portion of the inner wall of the pressure vessel bounding the supercritical temperature zone is scraped so as to dislodge at least a substantial portion of any solids which may be deposited thereon.

PCT published application PCT/US92/05320 (Modell No. 3) describes a method for oxidizing organic compounds under supercritical conditions in an elongate tube reactor. The reaction mixture of organic material is passed through the reactor at a velocity sufficient to minimize settling of a substantial portion of the inorganic materials present in the reaction mixture or formed under supercritical conditions. The outlet end of the reactor is cooled to rapidly form a two phase system in the reaction mixture. Inorganic salts, according to the application, substantially redissolve in the liquid phase of the cooled reaction mixture to minimize scaling problems.

None of the methods described are reported in commercial use at this time. Barton et al. discloses a process wherein essentially no inorganic materials are present in the effluent vapour being oxidized under supercritical conditions. Hong et al. discloses operating a reactor to have both a supercritical zone and a subcritical zone. The maintenance of both zones in a single reactor is technically difficult and Hong et al. does not contain any example to show that both zones could be maintained in an operating reactor. Huang discloses scraping the inner surface of the supercritical zone of the reactor of Hong et al. to prevent scale build-up. However, Huang discloses that scale build-up does occur and the mechanical action disclosed in Huang would be difficult to operate in practice and would result in a decreased lifetime of the reactor. Modell No. 3 requires high velocity throughput to achieve some reduction in scaling.

Accordingly, while supercritical water oxidation could be very useful in various areas of industry, no solution has yet been developed to the scaling problem which arises from the insolubility of inorganic materials in the supercritical region.

SUMMARY OF THE INVENTION

This invention relates to a method for oxidizing organic material in an aqueous stream in which inorganic salts are also present, or are formed under reaction conditions, under supercritical conditions, in the presence of a mobile surface to provide a surface to which insoluble inorganic salts can adhere.

The mobile surface may be in the form of a slurry of particles passed through the reactor with the aqueous stream containing organic materials and inorganic salts or in the form of a recirculating fluidized bed. The mobile surface may have a surface area many times greater than the surrounding reactor, and inorganic salts insoluble under supercritical conditions adhere to the mobile surface rather than internal surfaces of the reactor, valves, tubes etc.

The particles may be inert, catalytic or reactive in nature and may be reused after cleaning with water to remove inorganic salts insoluble under supercritical conditions but soluble under subcritical conditions.

The invention significantly reduces scaling caused by inorganic salts insoluble under supercritical conditions, thereby reducing the frequency with which the reactor must be cleaned and the associated costs of down-time for the reactor.

BRIEF DESCRIPTION OF THE DRAWINGS

The substance and advantages of the invention will now be more fully and completely discussed in connection with the following drawings in which.

DESCRIPTION OF THE PREFERRED EMBODIMENT

Figure 1:
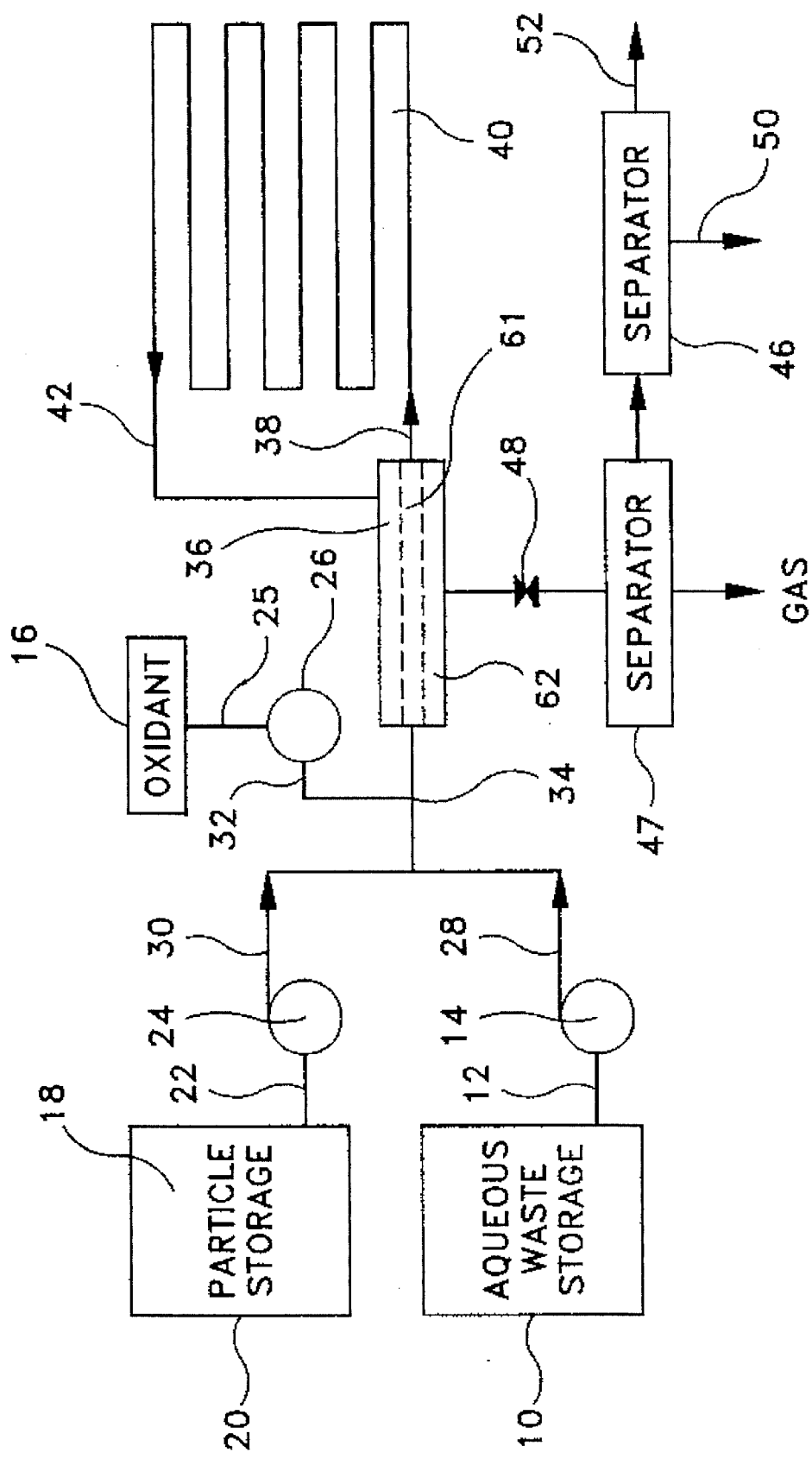
FIG. 1 is a schematic drawing of an embodiment of a method according to the invention.

One embodiment of the present invention is shown schematically in FIG. 1. Storage tank 10 stores an aqueous stream to be treated (often a waste stream) generally designated by reference 12. This aqueous stream 12 contains organic materials oxidizable under supercritical conditions and one or more inorganic materials such as salts and salt precursors (for example, calcium chloride, sodium chloride, sodium sulphide, sodium sulphate and calcium sulphate) which are substantially insoluble under the supercritical reaction conditions. The organic materials are preferably present in concentrations of 2% to 20% and, most preferably, 5% to 10%.

The inorganic materials may be present in concentrations of about 0% to 10%, preferably 0% to 5% and, most preferably, 0.5% to 1%.

The aqueous stream 12 is pressurized by pump means 14, which may be a high pressure piston pump or other pump capable of providing the pressures necessary for supercritical conditions (typically, pressures greater than 3200 psi), to form pressurized aqueous stream 28. A suitable pump, for example, is the MP606DI High Pressure Pump manufactured by FMC Corp. of Jonesboro Ark.

Particles 18 which are used to provide a mobile surface in the form of a slurry are introduced from particle storage 20. The particles 18 may be stored in the particle storage in the form of a slurry, as is the case in this embodiment, containing up to approximately 50% particles by weight. Alternatively, the particles 18 may be stored dry and mixed into a slurry as needed. The particles 18, form slurry stream 22, which is pressurized by slurry pump 24 to form pressurized slurry stream 30. Slurry pump means 24 may be a high pressure diaphram pump or other pump suitable for pumping a slurry and capable of providing the pressures necessary for supercritical conditions. A suitable pump, for example, is the Model P1000V800BT air operated oscillating pump manufactured by Williams Instrument Company Inc. of Valencia, Calif.

The slurry of particles 18 may be formed by adding water to the particles 18, or, to avoid dilution of the aqueous stream 12, liquid from the aqueous stream 12 may be used to form the slurry.

The particles 18 may be inert particles including, but not limited to, sand, silica, soil, titanium dioxide, clays, metallic particles or ceramic particles, in which cases, the particles are preferably cleaned and reused as discussed below.

The particles may also be catalytic particles such as Zeolites and heavy metal oxides or noble metals which can play a role in catalyzing the oxidation reaction as well as providing a surface to which insoluble inorganic salts can adhere.

As will be discussed in detail later, whatever the nature of the particles, they provide a mobile surface to which inorganic materials can adhere or on which they can precipitate during supercritical water oxidation.

Oxidant storage 16 provides an oxidant stream 25 which is pressurized by oxidant pump means 26 into pressurized oxidant stream 32. The oxidant may be any of those which are known in the art of oxidation, including but not limited to, hydrogen peroxide, sodium peroxide, compressed air, liquid oxygen, compressed oxygen and mixtures thereof. The pressurized oxidant stream 32 may be added to the pressurized aqueous stream 28 prior to it being combined with the pressurized slurry Stream 30, after the two streams are combined and before they enter the reactor 40 as shown in FIG. 1, may be added to the reactor itself, or a combination of the above.

The particles 18' may, in an alternate embodiment, be added to the pressurized aqueous stream 28 via pressurized oxidant stream 32.

In FIG. 1, the outflow from the pressurization pumps; pressurized aqueous stream 28, pressurized slurry stream 30 and pressurized oxidant stream 32 are mixed together to form combined stream 34. The particles 18 are dispersed within the combined stream 34 by introducing sufficient turbulence levels in all subsequent steps of the process until the particles are separated out. The particles 18 dispersed throughout combined stream 34 provide a mobile surface to which inorganic salts can adhere under supercritical conditions. Conventional methods for maintaining turbulent flow along a path include maintaining high velocity flow and placing obstructions or bends in the aqueous stream.

The combined stream 34 is fed through heat exchanger means 36. The temperature of combined stream 34 is raised during the passage through heat exchanger means 36 to a temperature near supercritical temperature of 374°. A counter current heat exchanger of conventional design is preferred in the embodiments shown here and has an inner tube 61 through which the combined stream 34 flows and an outer tube 62 through which the oxidized combined stream 42 flows, as described below, to allow heat exchange between the two streams. The outflow from the heat exchanger means 36 is a heated combined stream 38.

Oxidation of the organic compounds begins immediately on addition of oxidant 16 and the rate of oxidation increases as the temperature rises.

The temperature of the combined stream 34 rises as a result of the heat generated by oxidation of organic compounds in the combined stream and as a result of heating of the combined stream as it flows through the heat exchanger 36. The heated combined stream 38 is fed into a reactor means 40 wherein the supercritical oxidation occurs. Once supercritical conditions are achieved, the oxidation reaction proceeds very quickly. The reactor means 40 may be any type of vessel, pipe or other reactor known in the art which is capable of maintaining structural integrity at elevated temperatures and pressures. The residence time of the heated combined stream 38 in the reactor means 40 is sufficient to allow the oxidation reaction to proceed substantially to completion. A stoichiometric excess of oxidant present will often result in greater than 99% of oxidation of the organic compounds in the aqueous stream 12. Generally, due to the rapid nature of supercritical oxidation, a residence time of 1 minute or less in the reactor is sufficient.

Preferably, the contents of the reactor means 40 are raised to a temperature from about the critical temperature of the heated combined stream 34, which may be as low as 320° C., to about 800° C. or, more preferably, from about 374° C. to about 650° C. and, most preferably, to about 450° C. to 600° C. In order to maintain the desired temperature within reactor 40, additional heating or cooling of the reactor 40 may be necessary using conventional means known in the art.

It is in reactor 40, and downstream from the reactor, that scaling of the reactor walls and other system surfaces occurs. Scaling occurs when the temperature of combined stream is raised and supercritical conditions are achieved resulting in the precipitation of inorganic compounds insoluble under supercritical conditions. These precipitates, which are sometimes characterized as "sticky", adhere to, or precipitate onto, the reactor walls and other internal surfaces such as valves, heat exchangers, separators, etc. resulting in a scale build-up on such surfaces.

The particles contained in the heated combined stream 38 provide a mobile surface to which the inorganic precipitates can adhere, or on which they can precipitate, during the supercritical water oxidation process in reactor 40. Accordingly, depending on the relative surface areas of the particles and the surrounding reactor surfaces, scaling on the surrounding reactor surfaces is substantially reduced by the presence of the particles. This lengthens the time the reactor can operate before it must be shut down for descaling.

The particles can have a surface area, depending on the particle size and the concentration of the particles, thousands or more times higher than the surrounding reactor walls. Once the temperature of the contents of the reactor 40 exceeds the critical temperature of the heated combined stream 34, the organic compounds will be substantially oxidized and inorganic compounds will precipitate out of solution and onto the surfaces of the particles within the reactor 40. Some inorganic salts may still precipitate onto the walls of the reactor 40; however, this will be minimized due to the presence of the particles within the reactor 40 and the large surface area of the particles 18 relative to the surface area of the reactor walls.

It may be necessary in some cases, for example where sulfates or chlorides are produced through oxidation of sulphur or chlorine present in the organic materials in the aqueous stream, to add a cation source such as sodium hydroxide to precipitate the sulfates and chlorides.

The particles 18 will also "scour" the reactor walls which helps reduce the build-up of inorganic scale.

The reaction products of reactor 40, primarily water, carbon dioxide and particles 18, exit the reactor 40 as oxidized combined stream 42.

The outflow from reactor 40, oxidized combined stream 42, passes through the outer tube 62 of heat exchanger means 36 to recover any excess heat within oxidized combined stream 42 which heat is used to heat combined stream 34. The outflow from heat exchanger 36 is depressurized in depressurization means 48 which may be a pressure control valve or capillary pressure letdown system or other means known in the art wherein the pressure is reduced to atmospheric pressure or higher, depending on the system requirements.

The oxidized combined stream 42 enters separator means 47 which provides a first separation of gas (primarily carbon dioxide) from the water and particles in the oxidized combined stream. The oxidized combined stream 42 then enters a second separator 46 where particles and water are separated. The particles that are removed may be in the form of a slurry 50 and remaining liquid 52, may be in the form of steam or hot water or a mixture thereof. The separated particles 50 can then be reused as particles 18. Alternatively, the particles may be separated from the oxidized combined stream 42 before entering the heat exchanger 36. If this is done, the particles 18 will be coated with the inorganic precipitates which can be removed by washing or the particles and precipitates can be disposed of by other methods.

The remaining liquid 52 is primarily water since, in many cases, more than 99% of the organic material in the aqueous stream 12 has been removed.

The particles contained in the oxidized combined stream 42 when separated as slurry 50 may also be disposed of as solid waste rather than being reused.

Figure 2:
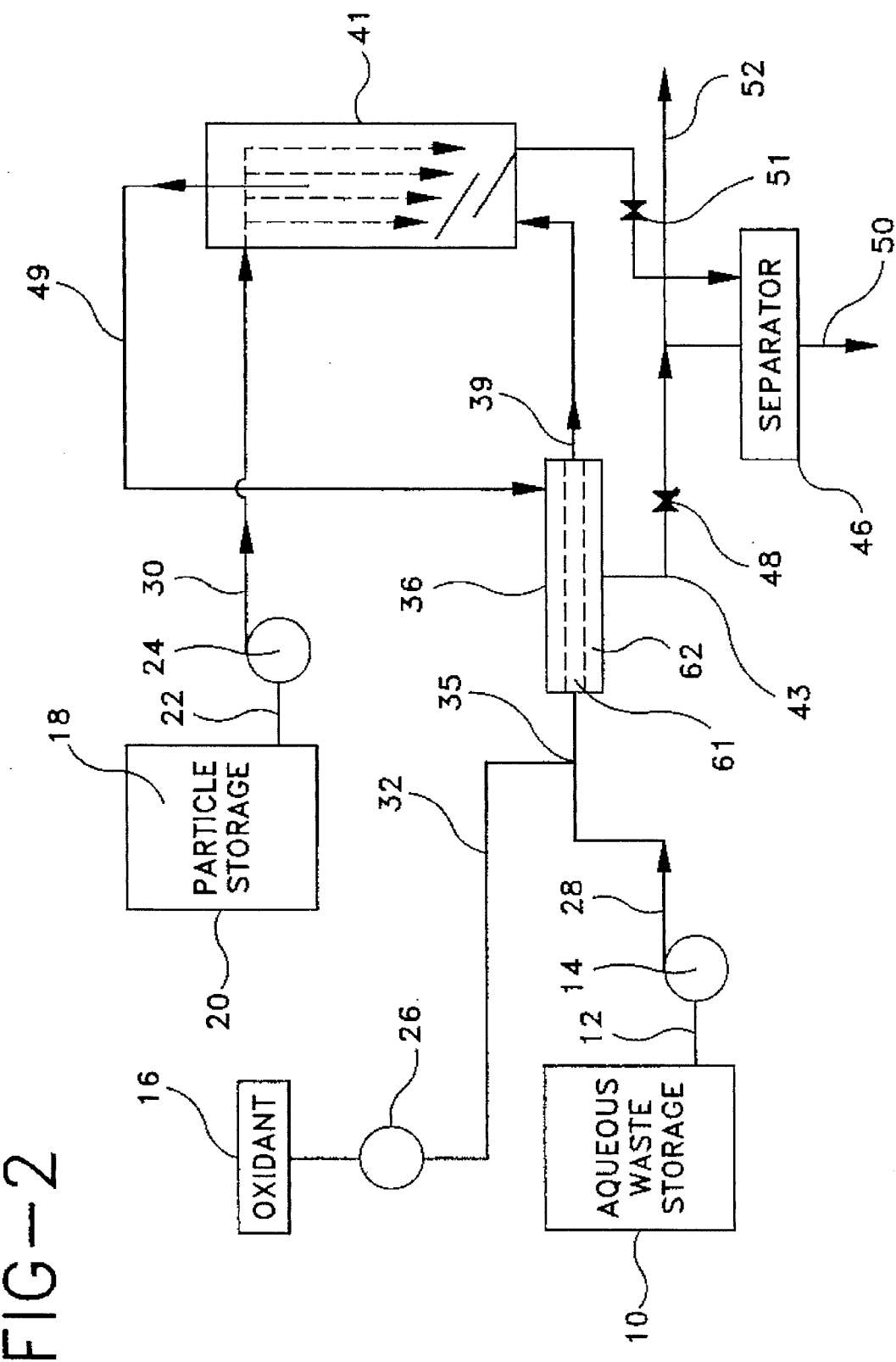
FIG. 2 is a schematic drawing of an alternate embodiment of a method according to the invention.

FIG. 1 shows an embodiment in which pressurized slurry stream 30 and pressurized aqueous stream 28 together with pressurized oxidant stream 32 flow through the reactor as heated combined stream 38 (that is, the components flow concurrently). FIG. 2 shows a second embodiment employing a vertical reactor in which the pressurized slurry stream 30 flows counter current to the heated combined stream 39 (oxidant and aqueous stream) through the reactor 41. FIG. 1 and FIG. 2 show embodiments having a number of elements in common and like numbers have been used to designate like elements for brevity.

FIG. 2 shows aqueous waste stream 12 from aqueous waste storage 10 being pressurized by high pressure piston pump 14 to form pressurized aqueous stream 28. Oxidant 16 is pressurized by pump means 26 to form pressurized oxidant stream 32 which is combined with pressurized aqueous stream 28. The pressurized combined stream 35 enters heat exchanger 36 where the temperature is raised to near the critical temperature. Heated combined stream 39 exits the heat exchanger and enters the reactor 41, which is a vertical reactor, near the bottom and flows upward. The particles 18 from particle storage 20 are pressurized by high pressure pump 24 to form pressurized slurry stream 30 which enters near the top of the reactor 41 so that the particles 18 travel counter current to the flow of the heated combined stream 39. The particles 18 are directed by baffles in the reactor and removed to pressure letdown 51 and separator 46 which separates particle slurry 50 from remaining liquid 52 consisting of steam or hot water or a mixture thereof. The oxidized combined stream 49 exits the reactor near its top and goes to heat exchanger 36 where heat is recycled to pressurized combined stream 35. The cooled combined stream 43 then goes to capillary pressure letdown 48. The particles in particle slurry 50 can be cleaned and reused or disposed of.

Alternatively, the particles 18 can be present in the reactor in a form of a recirculating fluidized bed of conventional design.

As will be apparent to persons skilled in the art, various combinations, modifications and adaptations of the methods described are possible without departure from the spirit of the invention.

We claim:

1. A method for oxidizing an aqueous stream containing organic compounds and one or more inorganic salts or salt precursors insoluble under the reaction conditions comprising oxidizing the organic compounds in a reactor under supercritical conditions for the aqueous stream in the presence of an oxidant and mobile particles which provide a surface to which inorganic salts insoluble under the supercritical reaction conditions can adhere.

2. The method of claim 1 in which the mobile particles which provide a surface is in the form of a slurry.

3. The method of claim 2 in which the slurry flows concurrently with the aqueous stream through the reactor.

4. The method of claim 2 in which the slurry flows counter current to the aqueous stream through the reactor.

5. The method of claim 1 in which the mobile particles which provide a surface is in the form of a recirculating fluidized bed.

6. The method of claims 2, 3 or 4 in which the particles are inert materials.

7. The method of claims 2, 3 or 4 in which the mobile particles which provide a surface is a material selected from the group consisting of sand, silica, titanium dioxide, clay, metallic or ceramic particles.

8. The method of claims 2, 3 or 4 in which the mobile particles which provide a surface is a catalytic particle selected from the group consisting of Zeolites, heavy metal oxides and noble metals.

9. The method of claims 1, 3 or 4 including the further steps of:
   (a) removing a portion of the mobile particles which provide a surface from the reactor;
   (b) dissolving any inorganic salts adhering to said portion of the particles which provide a surface;
   (c) recirculating said portion of the mobile particles which provide a surface into the reactor.

10. The method of claims 3, 4 or 5 in which the mobile particle surface has a surface area more than 1000 times greater than the surrounding reactor.

11. A method for oxidizing an aqueous stream containing organic compounds and one or more inorganic salts or salt precursors insoluble under the reaction conditions comprising oxidizing the organic compounds in a reactor under supercritical conditions for the aqueous stream in the presence of an oxidant and a mobile particle surface present in the form of an aqueous slurry having up to 50% particles by weight of said slurry, said mobile particle surface providing a surface to which inorganic salts insoluble under the supercritical reaction conditions can adhere.

\* \* \* \* \*

UNITED STATES PATENT AND TRADEMARK OFFICE
CERTIFICATE OF CORRECTION

PATENT NO. : 5,543,057
DATED : August 6, 1996
INVENTOR(S) : Whiting et al.

It is certified that error appears in the above-indentified patent and that said Letters Patent is hereby corrected as shown below:

column 5, line 22, incorrectly reads "slurry Stream 30". Column 5, line 22, should correctly read --slurry stream 30--.

column 5, line 26, incorrectly reads "The particles 18' may". Column 5, line 26, should correctly read --The particles 18 may--.

Signed and Sealed this

Third Day of December, 1996

Attest:

BRUCE LEHMAN

Attesting Officer     Commissioner of Patents and Trademarks